United States Patent
Zhang

(10) Patent No.: US 10,712,914 B2
(45) Date of Patent: Jul. 14, 2020

(54) METHOD, APPARATUS AND COMPUTER PROGRAM PRODUCT FOR USER INTERFACE DYNAMIC DISPLAY BASED ON TIME THAT A DEVICE HAS BEEN IN LOCKED STATE

(71) Applicant: Nokia Technologies Oy, Espoo (FI)

(72) Inventor: Liang Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 102 days.

(21) Appl. No.: 14/779,010

(22) PCT Filed: Mar. 22, 2013

(86) PCT No.: PCT/CN2013/073057
§ 371 (c)(1),
(2) Date: Sep. 21, 2015

(87) PCT Pub. No.: WO2014/146292
PCT Pub. Date: Sep. 25, 2014

(65) Prior Publication Data
US 2016/0048278 A1 Feb. 18, 2016

(51) Int. Cl.
*G06F 3/048* (2013.01)
*G06F 3/041* (2006.01)
(Continued)

(52) U.S. Cl.
CPC ............ *G06F 3/0484* (2013.01); *G06F 21/31* (2013.01); *H04L 63/108* (2013.01); *H04M 1/67* (2013.01);
(Continued)

(58) Field of Classification Search
CPC . G06F 3/048; G06F 3/00; G06F 21/00; G06F 3/041
See application file for complete search history.

(56) References Cited

U.S. PATENT DOCUMENTS 5,390,295 A * 2/1995 Bates .................... G06F 3/0481
714/E11.188
6,874,094 B2  3/2005 Parker
(Continued)

FOREIGN PATENT DOCUMENTS

| CN | 102945114 A | 2/2013 |
| EP | 1950679 A1 | 7/2008 |
| EP | 2525469 A2 | 11/2012 |

OTHER PUBLICATIONS

International Search Report of corresponding International Application No. PCT/CN2013/073057, dated Dec. 26, 2013 (3 pages).
(Continued)

*Primary Examiner* — Hugo Molina
(74) *Attorney, Agent, or Firm* — Alston & Bird LLP

(57) ABSTRACT

An apparatus, method, and computer program product for: receiving an indication of a lock signal at a first point in time, receiving an indication of an unlock signal at a second point in time, determining a lock period based on the first point in time and the second point in time, and, in dependence on the determined lock period, selecting a user interface view for displaying upon unlocking a device, wherein the unlocking is performed in response to the received indication of the unlock signal.

11 Claims, 4 Drawing Sheets

(51) Int. Cl.
   *G06F 3/00*      (2006.01)
   *G06F 3/0484*    (2013.01)
   *H04W 12/08*     (2009.01)
   *G06F 21/31*     (2013.01)
   *H04L 29/06*     (2006.01)
   *H04M 1/67*      (2006.01)
   *H04W 88/02*     (2009.01)
   *H04W 12/00*     (2009.01)

(52) U.S. Cl.
   CPC ........ *H04W 12/08* (2013.01); *H04M 2250/22* (2013.01); *H04W 12/00502* (2019.01); *H04W 88/02* (2013.01)

(56) References Cited

U.S. PATENT DOCUMENTS

| | | | | |
|---|---|---|---|---|
| 2003/0010043 | A1* | 1/2003 | Ferragut, II | G06F 3/04817 62/126 |
| 2004/0124280 | A1 | 7/2004 | Shih et al. | |
| 2007/0150842 | A1* | 6/2007 | Chaudhri | G06F 3/04883 715/863 |
| 2008/0172026 | A1* | 7/2008 | Blomquist | G06F 19/3468 604/500 |
| 2009/0241031 | A1* | 9/2009 | Gamaley | G06F 3/0481 715/736 |
| 2011/0061021 | A1* | 3/2011 | Kang | G06F 3/0481 715/800 |
| 2011/0102345 | A1* | 5/2011 | Kim | G06F 3/04883 345/173 |
| 2011/0191713 | A1* | 8/2011 | Numazaki | G06F 3/048 715/800 |
| 2011/0260829 | A1* | 10/2011 | Lee | G06F 3/0414 340/5.51 |
| 2011/0294467 | A1* | 12/2011 | Kim | G06F 1/1643 455/411 |
| 2011/0296028 | A1* | 12/2011 | Sasaoka | G06F 9/526 709/226 |
| 2012/0060123 | A1 | 3/2012 | Smith | |
| 2012/0129496 | A1 | 5/2012 | Park et al. | |
| 2012/0315881 | A1* | 12/2012 | Woloshyn | G06F 3/0488 455/412.2 |
| 2013/0093707 | A1* | 4/2013 | Park | G06F 21/31 345/173 |
| 2013/0143512 | A1* | 6/2013 | Hernandez | H04W 4/00 455/404.1 |
| 2013/0326611 | A1* | 12/2013 | Gargi | G06F 21/31 726/16 |

OTHER PUBLICATIONS

International Preliminary Report on Patentability and Written Opinion for Application No. PCT/CN2013/073057 dated Oct. 1, 2015.
Extended European Search Report for corresponding European Application No. 13878639.7 dated Oct. 31, 2016, 9 pages.
Office Action for European Patent Application No. 13878639.7 dated Sep. 20, 2017, 6 pages.
Office Action for Indonesian Application No. P00201506588 dated Jul. 15, 2019.

* cited by examiner

METHOD, APPARATUS AND COMPUTER PROGRAM PRODUCT FOR USER INTERFACE DYNAMIC DISPLAY BASED ON TIME THAT A DEVICE HAS BEEN IN LOCKED STATE

CROSS REFERENCE TO RELATED APPLICATION

This application is a national phase entry of International Application No. PCT/CN2013/073057, filed Mar. 22, 2013, the entire contents of which are hereby incorporated by reference.

TECHNICAL FIELD

The present application relates generally to selecting a user interface view for displaying by an apparatus.

BACKGROUND

Electronic devices typically contain different user interface views for viewing and interacting with a device.

SUMMARY

Various aspects of examples of the invention are set out in the claims.

According to a first aspect of the present invention, there is provided a method comprising receiving an indication of a lock signal at a first point in time, receiving an indication of an unlock signal at a second point in time, determining a lock period based on the first point in time and the second point in time, and, in dependence on the determined lock period, selecting a user interface view for displaying upon unlocking a device, wherein the unlocking is performed in response to the received indication of the unlock signal.

According to a second aspect of the present invention, there is provided an apparatus comprising a processor, memory including computer program code, the memory and the computer program code configured to, working with the processor, cause the apparatus to perform at least the following: receive an indication of a lock signal at a first point in time, receive an indication of an unlock signal at a second point in time, determine a lock period based on the first point in time and the second point in time, and, in dependence on the determined lock period, select a user interface view for displaying upon unlocking a device, wherein the unlocking is performed in response to the received indication of the unlock signal.

According to a third aspect of the present invention, there is provided a computer program product comprising a computer-readable medium bearing computer program code embodied therein for use with a computer, the computer program code comprising code for receiving an indication of a lock signal at a first point in time, code for receiving an indication of an unlock signal at a second point in time, code for determining a lock period based on the first point in time and the second point in time, and code for, in dependence on the determined lock period, selecting a user interface view for displaying upon unlocking a device, wherein the unlocking is performed in response to the received indication of the unlock signal.

According to a fourth aspect of the present invention there is provided an apparatus, comprising means for receiving an indication of a lock signal at a first point in time, means for receiving an indication of an unlock signal at a second point in time, means for determining a lock period based on the first point in time and the second point in time, and means for, in dependence on the determined lock period, selecting a user interface view for displaying upon unlocking a device, wherein the unlocking is performed in response to the received indication of the unlock signal.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention and its potential advantages are understood by referring to FIGS. 1 through 4 of the drawings.

Example embodiments relate to selecting a user interface view. According to an example embodiment the user interface view is selected for displaying upon unlocking a device. The user interface view may be selected in dependence on a determined lock period of a device.

The term "upon" unlocking may comprise during the process of unlocking and/or after completion of the process of unlocking. The process of unlocking may comprise a period of time used for unlocking and/or one or more operations during the process of unlocking.

Figure 1:
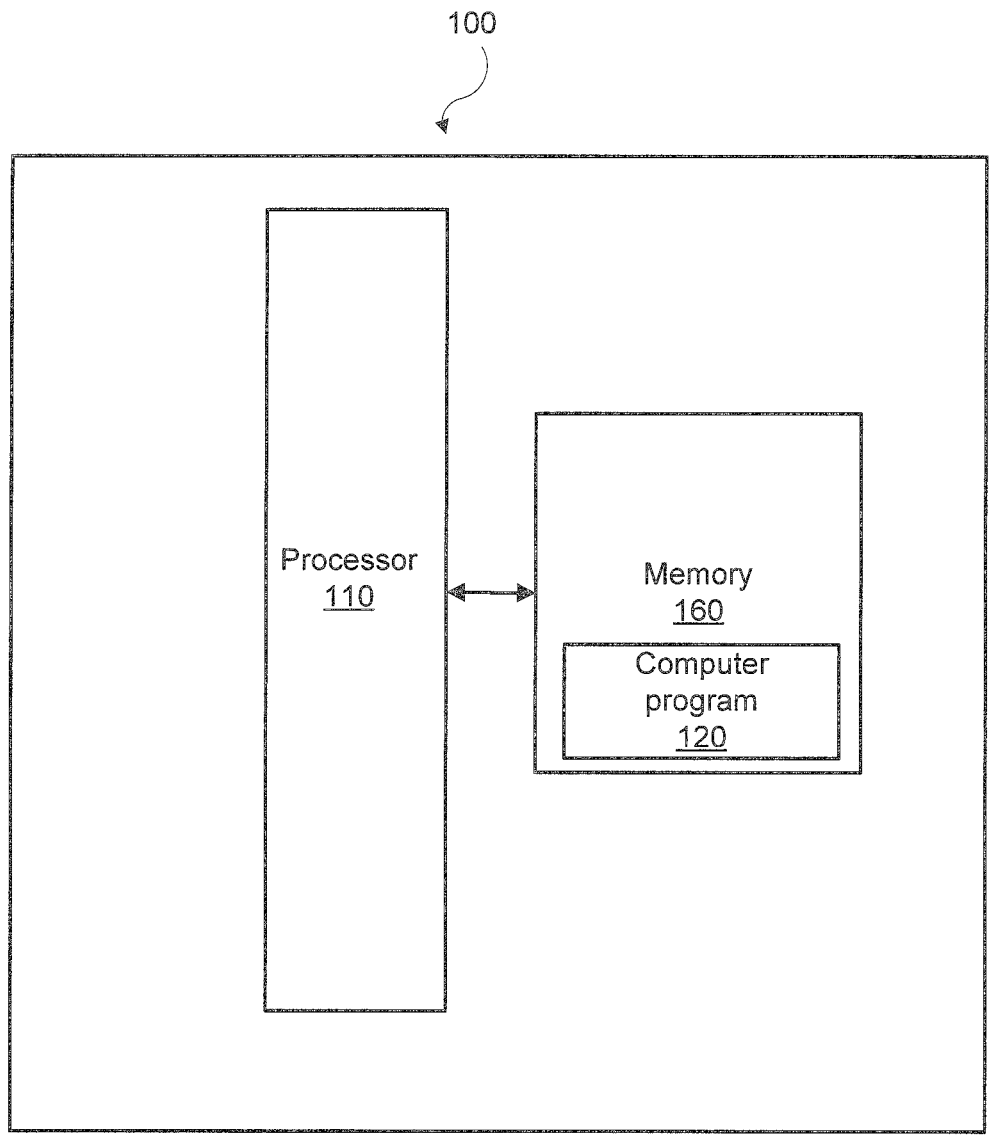
FIG. 1 shows a block diagram of an example apparatus in which examples of the disclosed embodiments may be applied.

FIG. 1 is a block diagram depicting an apparatus 100 operating in accordance with an example embodiment of the invention. The apparatus 100 may, for example, be an electronic device such as a chip or a chip-set. The apparatus 100 includes a processor 110 and a memory 160. In other examples, the apparatus 100 may comprise multiple processors.

In the example of FIG. 1, the processor 110 is a control unit operatively connected to read from and write to the memory 160. The processor 110 may also be configured to receive control signals received via an input interface and/or the processor 110 may be configured to output control signals via an output interface. In an example embodiment the processor 110 may be configured to convert the received control signals into appropriate commands for controlling functionalities of the apparatus.

The memory 160 stores computer program instructions 120 which when loaded into the processor 110 control the operation of the apparatus 100 as explained below. In other examples, the apparatus 100 may comprise more than one memory 160 or different kinds of storage devices.

Computer program instructions 120 for enabling implementations of example embodiments of the invention or a part of such computer program instructions may be loaded onto the apparatus 100 by the manufacturer of the apparatus 100, by a user of the apparatus 100, or by the apparatus 100 itself based on a download program, or the instructions can be pushed to the apparatus 100 by an external device. The computer program instructions may arrive at the apparatus 100 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

Figure 2:
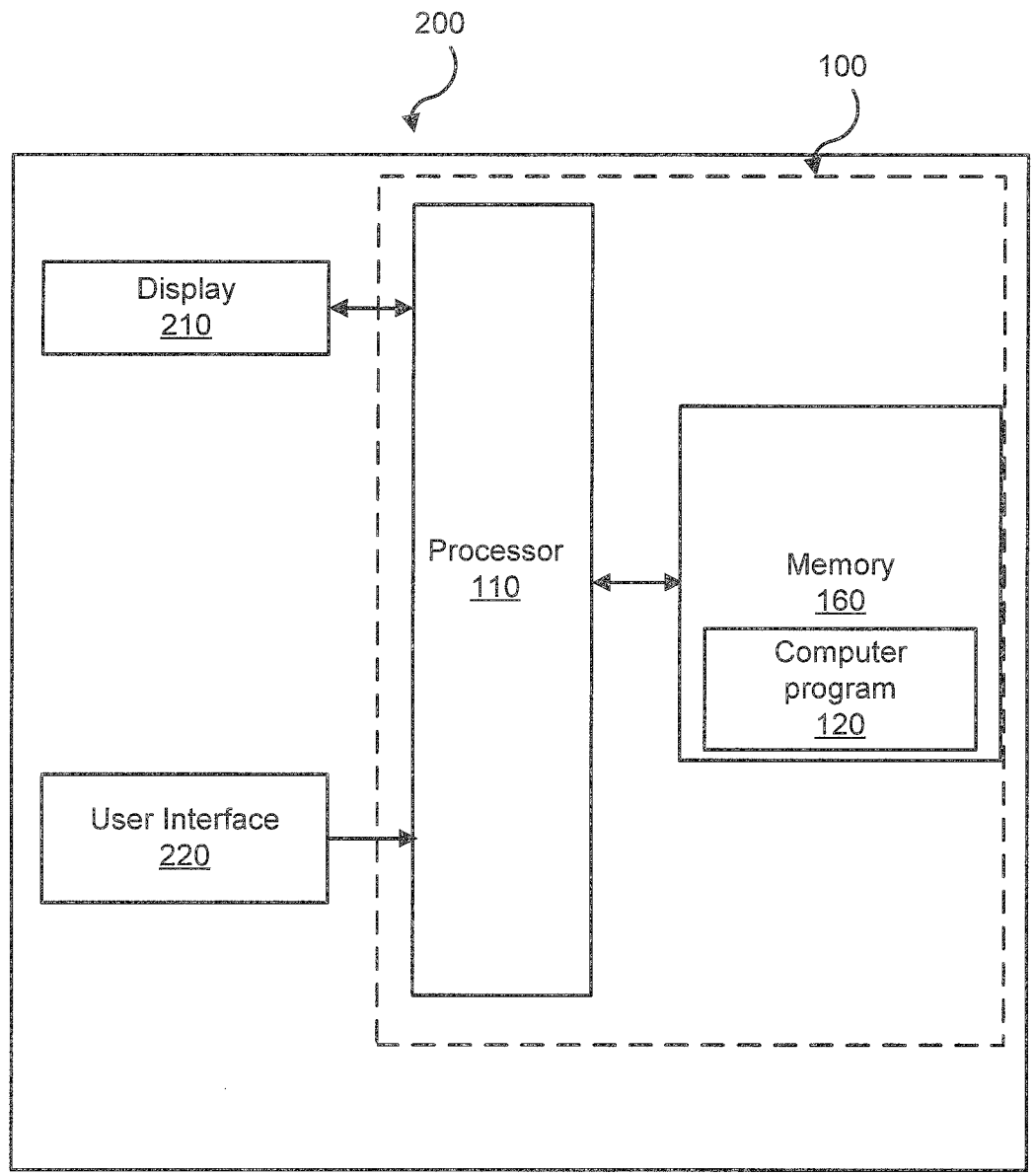
FIG. 2 shows a block diagram of another example apparatus in which examples of the disclosed embodiments may be applied.

FIG. 2 is a block diagram depicting an apparatus 200 in accordance with an example embodiment of the invention. The apparatus 200 may be an electronic device such as a hand-portable device, a mobile phone or a Personal Digital Assistant (PDA), a Personal Computer (PC), a laptop, a desktop, a tablet computer, a wireless terminal, a communication terminal, a game console, a music player, an electronic book reader (e-book reader), a positioning device, a digital camera, a CD-DVD or Blu-ray player, or a media player. The apparatus 200 may also be, or be comprised in, a household appliance such as a refrigerator, a coffee maker, or any other suitable device such as a dashboard in a car. In the examples of FIGS. 2 and 3 it is assumed that the apparatus 200 is a mobile computing device.

In this example, the mobile computing device 200 is illustrated as comprising the apparatus 100, a display 210 and a user interface 220. However, the display 210 and/or user interface 220 may be external to the apparatus 200 but in communication with it. In some examples the display 210 may be incorporated into the user interface 220: for example, the user interface 220 may include a touch screen display.

In the example of FIG. 2 the user interface 220 is configured to enable inputting and accessing information in the mobile computing device 200. According to an example embodiment, the user interface 220 comprises a surface capable of receiving user inputs. The surface may be an input surface such as a touch screen or a touch pad. In some example embodiments, the mobile computing device 200 may include both a touch screen and a touch pad or multiple surfaces capable of receiving user inputs. A touch screen may be configured not to only enable accessing and/or inputting information but also to display user interface objects, while a touch pad may be configured to enable accessing and/or inputting information and a separate display may be provided. In some example embodiments, no display is provided. A user may input and access information by using a suitable input means such as a pointing means, one or more fingers, a stylus or a digital pen.

In an example embodiment, inputting and accessing information is performed by touching the surface such as the surface of a touch screen display 210 or a touch pad. Additionally or alternatively, proximity of an input means such as a finger or a stylus may be detected and inputting and accessing information may be performed by hovering the finger or the stylus over the surface. In a further example embodiment the surface may be a multi-touch surface configured to detect multiple at least partially concurrent touches on the surface.

A touch screen or a touch pad may be based on one or more of several different technologies. For example, different touch screen and pad technologies include resistive, capacitive, Surface Acoustic Wave (SAW), infrared, strain gauge, optical imaging, dispersive signal technology and acoustic pulse recognition touch screens. A touch screen or a touch pad may also operate using a combination of different technologies.

Additionally or alternatively, the user interface 220 may also comprise a manually operable control such as a button, a key, a touch pad, a joystick, a stylus, a pen, a roller, a rocker, a keypad, a keyboard or any suitable input mechanism for inputting and/or accessing information. Further examples include a microphone, a speech recognition system, eye movement recognition system, acceleration-, tilt- and/or movement-based input systems.

Referring back to the example of FIG. 2, in addition to a display, the mobile computing device 200 may include another kind of an output device such as a tactile feedback system for presenting tactile and/or haptic information for a user. The tactile feedback system may be configured to receive control signals provided by the processor 110. The tactile feedback system may be configured to indicate a completed operation or to indicate selecting an operation, for example. In an example embodiment a tactile feedback system may cause the mobile computing device 200 to vibrate in a certain way to inform a user of an activated and/or completed operation.

In the example of FIG. 2, the apparatus 100 is configured to receive an indication of a lock signal at a first point in time and an unlock signal at a second point in time. The lock signal may be triggered by input from the user of the mobile computing device 200 or the lock signal may be caused by the apparatus 100, for example, based on a detection that the mobile computing device 200 has not been used by the user for a particular period of time.

The lock signal may comprise a signal causing the mobile device 200 to enter a locked mode. Entering a locked mode may comprise disabling at least some input means such as a touch screen 210, 220 or one or more keys, or the locked mode may comprise restricting unauthorized use of the mobile computing device 200 or disabling one or more functions of the mobile computing device 200.

The unlock signal may comprise a signal causing the mobile computing device 200 to enter an unlocked mode from the locked mode. Entering the unlock mode may comprise enabling input means that were disabled upon locking the mobile computing device 200, enabling less restricted access to the mobile computing device 200 or enabling functions that were disabled in the locked mode.

According to an example embodiment, the apparatus 100 is configured to determine a lock period based on the first point in time and the second point in time. The lock period may comprise a time period between the lock signal at the first point in time and the unlock signal at the second point in time. In an example, the lock period may comprise the duration of the mobile computing device 200 having been in the locked mode. For example, the apparatus 100 may be configured to start a timer upon receiving the indication of a lock signal at a first point in time and stop the timer upon receiving the indication of an unlock signal at a second point in time. The apparatus 100 may further be configured to determine the lock period based on the elapsed time between the first point in time and the second point in time.

In an example embodiment the apparatus 100 may be configured to store the first point in time upon receiving the indication of a lock signal and calculate the time elapsed from the first point in time upon receiving the indication of an unlock signal at a second point in time. In an example embodiment both the first point in time and the second point in time may be stored and the elapsed time between the first point in time and the second point in time may be determined by the apparatus 100 by subtracting the first point in time from the second point in time.

In an example, the lock period may be determined upon receiving the indication of an unlock signal or upon unlocking the mobile computing device 200. In some examples, receiving the indication of a lock signal or receiving the indication of an unlock signal may be included in the lock period. In some examples, both receiving the indication of the lock signal and receiving the indication of the unlock signal may be included in the lock period.

The lock and/or the unlock signal may comprise receiving a user input such as an input via one or more hardware or virtual keys, a touch gesture on a touch screen, a hover gesture above a touch screen, a motion gesture detected by a camera, accelerometer or gyroscope, a voice or other audio input, or any suitable lock/unlock signal. For example, a lock gesture may comprise a hover gesture in close proximity to, but not touching, a touch screen and an unlock gesture may comprise a motion gesture indicating that the user picked the mobile computing device 200 up.

According to an example embodiment the apparatus 100 is configured to select a user interface view for displaying upon unlocking the mobile computing device 200 in dependence on the determined lock period. For example, a first user interface view may be selected if the determined lock period is greater than a pre-determined threshold value. In an example, a second user interface view may be selected if the determined lock period is less than a pre-determined threshold value. In an example embodiment the selected user interface view may be continuously updated in terms of continuously determining which user interface view is to be selected and selecting a particular user interface view upon unlocking the mobile computing device 200.

A selected user interface view may comprise any information presented on a display. In some examples a selected user interface view may comprise items that are configured to receive a user input and/or display information to the user. For example, a selected user interface view may comprise an application such as a gallery application, a map application, calendar application, media player or a social media application. The selected user interface view may also comprise a widget, a file, a news or advert feed, a status update from a network, device specific information, person specific information, calendar alert, information relating to a communication event such as a phone call or a text message or any other suitable information.

According to an example embodiment the user may define one or more default user interface views for displaying in different circumstances. The user may define criteria based on which one or more particular user interface views may be selected for displaying. The criteria may comprise, for example, time specific criteria such as a particular point in time, a particular period of time, or a time zone. The criteria may also comprise context specific criteria such as whether the user is moving/travelling, a type of upcoming appointment in a calendar application (e.g. a meeting, a holiday etc.) or the location of the user. For example, the user may define that upon unlocking the mobile computing device 200 a calendar application is displayed for the user if the determined unlock period is more than 8 hours. As another example, the user may define that upon unlocking the mobile computing device 200 a map application is displayed for the user if the determined unlock period is 10 minutes and the user's time zone has changed within the past 5 days.

In an example embodiment, the user may define a default combination of user interface views for displaying upon unlocking the mobile computing device 200. For example, a user may define that a default user interface view comprises a calendar application and a shopping list. In addition, one or more criteria may be defined for the default combination of user interface views as explained above.

According to an example embodiment, the selected user interface view comprises a home screen if the determined lock period is greater than a pre-defined threshold value. A home screen of a mobile computing device 200 may comprise, for example, static information and/or dynamic information, one or more applications and/or widgets. A home screen may comprise a collection of information and/or applications that are considered relevant for a user. The home screen may be at least partially configured by the user or it may be updated based on user behavior. For example, the home screen may comprise frequently used applications or last used applications. In some examples the mobile computing device 200 may comprise one or more home screens.

Without limiting the scope of the claims, an advantage of selecting a home screen for displaying when the determined lock period is greater than a pre-defined threshold value may be that the user may possibly see the most relevant information upon unlocking the mobile computing device 200. If the mobile computing device 200 was in a locked mode for a longer time than a pre-defined threshold value, it may be assumed that the most relevant information for the user at the time of unlocking the device is presented on the home screen where typically different kinds of dynamic information in terms of status updates, upcoming calendar events, received messages and/or phone calls etc. is presented.

According to an example embodiment, the selected user interface view comprises a previously used application if the determined lock period is less than a pre-defined threshold value. The previously used application may be, for example, an application that was previously launched or selected by the user. In an example embodiment the previously used application comprises an application that was active upon receiving the indication of a lock signal. An active application may comprise an application that was not closed upon locking the mobile computing device 200. In an example embodiment the previously used application comprises a most recently and/or most frequently used application.

Without limiting the scope of the claims, an advantage of selecting a previously used application for displaying if the determined lock period is less than a pre-defined threshold value may be that the user may see information that may still be relevant to him upon unlocking the mobile computing device 200. For example, assuming that the previously used application is a map application and the mobile computing device 200 is in the locked mode only for a short period of time, the map application may still be relevant for the user if the user is trying to find a particular location.

According to an example embodiment, the first user interface view and the second user interface view are different user interface views.

The pre-defined threshold value may comprise, for example, a duration of one or more seconds, minutes, hours, days, weeks or months. In an example embodiment the pre-defined threshold value may comprise a particular point in time such as a midnight, noon, a beginning of a work day, an end of a work day, lunch time or dinner time.

In an example embodiment, the pre-defined threshold value may be set by a user of the mobile computing device 200. In an example the pre-defined threshold value may be defined by the apparatus 100, for example, based on detected user behavior. In an example embodiment the pre-defined threshold value may be set by the manufacturer of the mobile computing device 200.

According to an example embodiment, the pre-defined threshold value is associated with a user interface view. The pre-defined threshold may depend on a user interface view that was active upon receiving the indication of a lock signal. The pre-defined threshold value may correspond to how soon the information provided by the user interface view becomes irrelevant or invalid for the user. For example, information provided by a calendar application may become irrelevant/invalid sooner than information provided by a gallery application.

In an example embodiment, a threshold value associated with a user interface view may depend on one or more criteria. For example, generally information provided by a map application may not become irrelevant/invalid very soon, but if the information provided by the map application relates to an appointment at a particular point in time, the information may become invalid sooner. The criteria may relate to the user interface view, to a characteristic of a user interface view, to other user interface views, a state of the user interface view or to temporal information. In some examples, a threshold value may vary, for example, based on the time of the day, user's behavior or user's location. In an example, more than one pre-defined threshold values may be associated with a user interface view.

According to an example embodiment, the selected user interface view is displayed for the user upon unlocking the device.

Without limiting the scope of the claims, an advantage of selecting a user interface view for displaying upon unlocking a device in dependence on the determined lock period may be that the user may view possibly relevant information upon unlocking the device. For example, it may be assumed that the user checked a shopping list on his device in the evening and then locked his device. In the morning when the user again unlocks his device, the shopping list may not be relevant for the user any more, but it may be beneficial to display, for example, the home screen comprising calendar appointments for the day.

FIGS. 3a to 3d illustrate an example user interface incorporating aspects of the disclosed embodiments. In this example, the user interface is comprised by the mobile computing device 200 of the example of FIG. 2. The mobile computing device comprises a touch screen display 210 incorporated into the user interface 220.

Figure 3B:
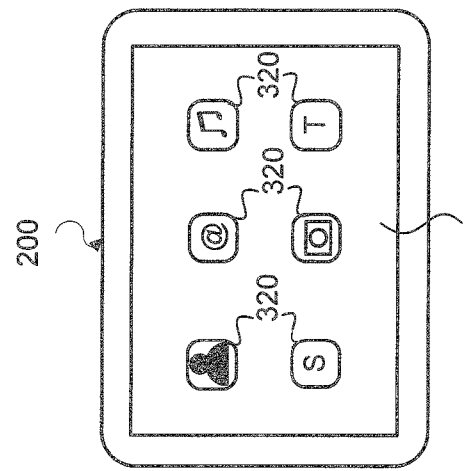
FIGS. 3a to 3d illustrate a user interface in accordance with an example embodiment of the invention.
Figure 3D:
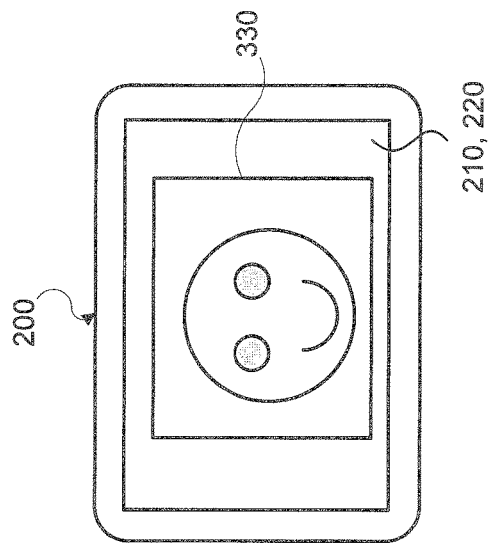
Figure 3A:
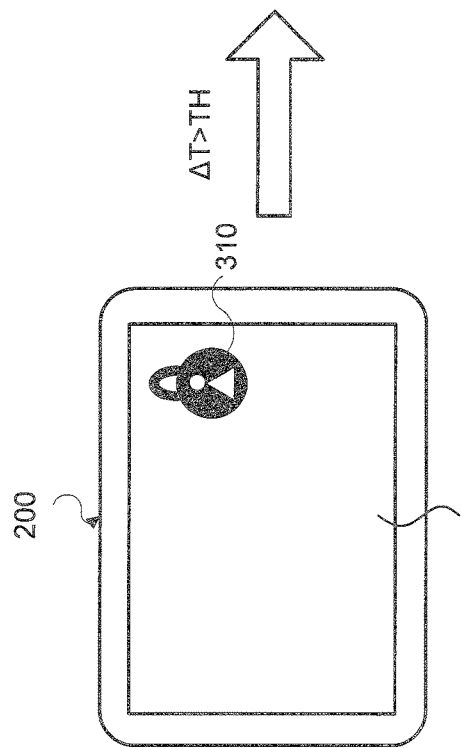

In the example of FIG. 3a, the user has locked the mobile computing device 200 as indicated by the lock symbol 310. When the user unlocks the mobile computing device 200, it is determined by the apparatus 100 that the lock period ΔT is greater than a pre-defined threshold value TH. In this situation, the apparatus 100 is configured to select a home screen for displaying to the user. In the example of FIG. 3b, a home screen comprising applications 320 such as a contacts application, email application, music player, a social media application, a camera application and a note application is displayed to the user.

Figure 3C:
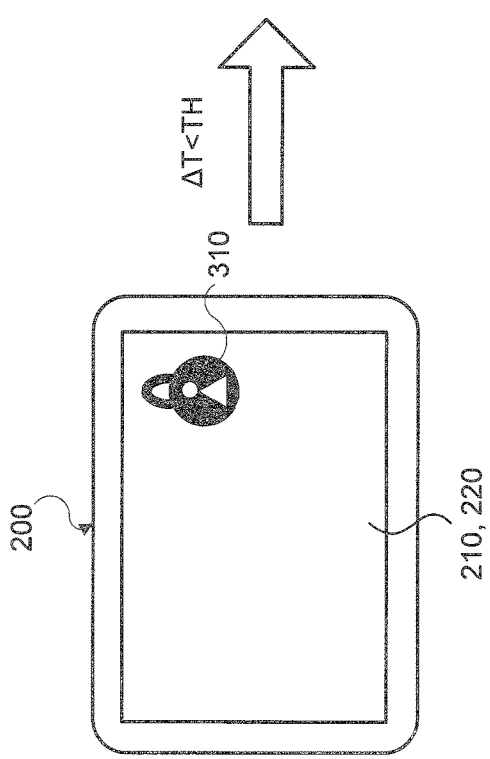

In the example of FIG. 3c, the user has locked the mobile computing device 200 as indicated by the lock symbol 310. When the user unlocks the mobile computing device 200, it is determined by the apparatus 100 that the lock period ΔT is less than a pre-defined threshold value TH. In this situation, the apparatus 100 is configured to select a previously used application for displaying to the user. In the example of FIG. 3d, the previously used application is a gallery application displaying a picture 330 that was displayed upon locking the mobile computing device 200.

Figure 4:
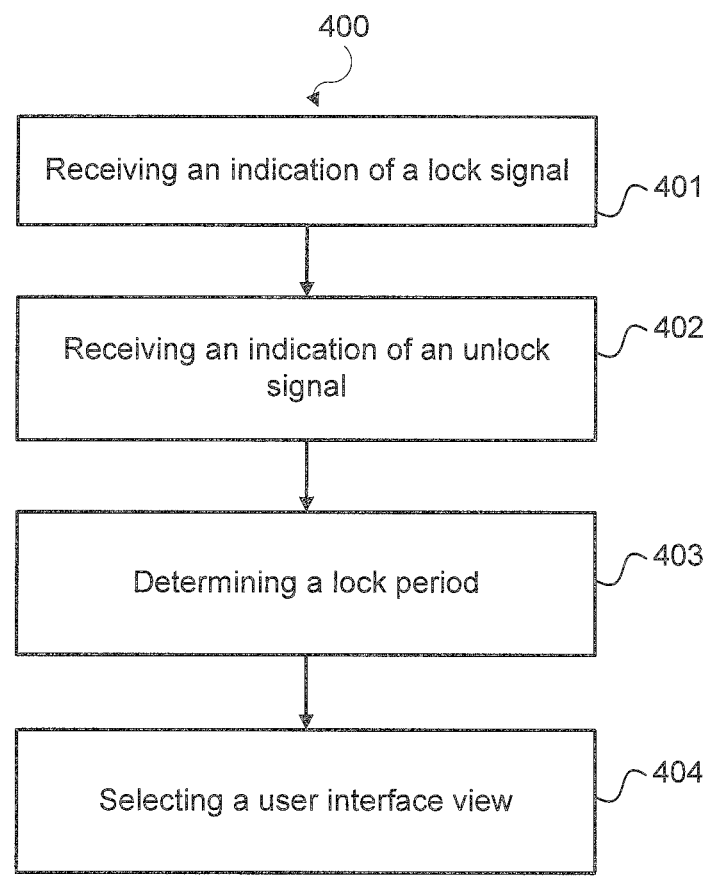
FIG. 4 illustrates an example method incorporating aspects of example embodiments of the invention.

FIG. 4 illustrates an example method 400 incorporating aspects of the previously disclosed embodiments. In this example it is assumed that the method is implemented in the mobile computing device 200. More specifically the example method 400 illustrates selecting a user interface view for displaying upon unlocking the mobile computing device 200.

The method starts with receiving 401 indication of a lock signal at a first point in time. At block 402, an indication of an unlock signal is received at a second point in time.

The method continues with determining 403 a lock period based on the first point in time and the second point in time and selecting 404 a user interface view for displaying upon unlocking the mobile computing device 200 in dependence on the determined lock period.

As discussed earlier, the selected user interface view may comprise a first user interface view if the determined lock period is greater than a pre-defined threshold value and a second user interface view of the determined lock period is less than a pre-defined threshold value. The first user interface view may comprise a home screen and the second user interface view may comprise a previously used application such as an application that was active upon receiving the indication of a lock signal. In an example embodiment, the pre-defined threshold value depends on the user interface view that was active upon receiving the indication of the lock signal.

Without in any way limiting the scope, interpretation, or application of the claims appearing below, a technical effect of one or more of the example embodiments disclosed herein may be that relevant information is selected for displaying to the user upon unlocking the mobile computing device 200. For example, if the mobile computing device 200 has been in a locked mode for a long period of time, the application that was active upon locking the device may not be relevant for the user any more, but, for example, information on the home screen may be more relevant for the user. Another technical effect of one or more of the example embodiments disclosed herein is that the user does not need to separately exit the previously used application when the mobile computing device 200 is unlocked after a longer period of time. A further technical effect of one or more of the example embodiments disclosed herein is that the user does not need to re-launch an application if the mobile computing device is locked for a shorter period of time, but the apparatus 100 may assume that the information presented upon locking the device is still relevant for the user.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   receiving an indication of a lock signal at a first point in time;
   receiving an indication of an unlock signal at a second point in time;
   upon receiving the indication of the unlock signal, determining a lock period based on the first point in time and the second point in time, wherein the lock period comprises a time period between the lock signal at the first point in time and the unlock signal at the second point in time; and
   in dependence on the determined lock period, selecting a user interface view for displaying upon unlocking a device in an instance in which the determined lock period is greater than a pre-defined threshold value and selecting a second user interface view for displaying upon unlocking the device in an instance in which the determined lock period is less than the pre-defined threshold value, wherein the unlocking is performed in response to the received indication of the unlock signal.

2. A method according to claim 1, wherein the selected user interface view comprises a home screen.

3. A method according to claim 1, wherein the selected user interface view comprises a previously used application.

4. A method according to claim 3, wherein the previously used application comprises an application that was active upon receiving the indication of a lock signal.

5. A method according to claim 1, wherein the pre-defined threshold value depends on a user interface view that was active upon receiving the indication of a lock signal.

6. An apparatus, comprising:
   a processor, and memory including computer program code, the memory and the computer program code configured to, working with the processor, cause the apparatus to perform at least the following:
   receive an indication of a lock signal at a first point in time;
   receive an indication of an unlock signal at a second point in time;
   upon receiving the indication of the unlock signal, determine a lock period based on the first point in time and the second point in time, wherein the lock period comprises a time period between the lock signal at the first point in time and the unlock signal at the second point in time; and
   in dependence on the determined lock period, select a user interface view for displaying upon unlocking a device in an instance in which the determined lock period is greater than a pre-defined threshold value and select a second user interface view for displaying upon unlocking the device in an instance in which the determined lock period is less than the pre-defined threshold value, wherein the unlocking is performed in response to the received indication of the unlock signal.

7. An apparatus according to claim 6, wherein the selected user interface view comprises a home screen.

8. An apparatus according to claim 6, wherein the selected user interface view comprises a previously used application.

9. An apparatus according to claim 8, wherein the previously used application comprises an application that was active upon receiving the indication of a lock signal.

10. An apparatus according to claim 6, wherein the pre-defined threshold value depends on a user interface view that was active upon receiving the indication of a lock signal.

11. A computer program product comprising a non-transitory computer-readable medium bearing computer program code embodied therein for use with a computer, the computer program code comprising:
    code for receiving an indication of a lock signal at a first point in time;
    code for receiving an indication of an unlock signal at a second point in time;
    code for determining, upon receiving the indication of the unlock signal, a lock period based on the first point in time and the second point in time, wherein the lock period comprises a time period between the lock signal at the first point in time and the unlock signal at the second point in time; and
    code for, in dependence on the determined lock period, selecting a user interface view for displaying upon unlocking a device in an instance in which the determined lock period is greater than a pre-defined threshold value and selecting a second user interface view for displaying upon unlocking the device in an instance in which the determined lock period is less than the pre-defined threshold value, wherein the unlocking is performed in response to the received indication of the unlock signal.

* * * * *